US012395097B2

(12) United States Patent
Handa et al.

(10) Patent No.: US 12,395,097 B2
(45) Date of Patent: Aug. 19, 2025

(54) POWER CONVERSION APPARATUS, AIR CONDITIONER AND REFRIGERATION APPARATUS

(71) Applicant: DAIKIN INDUSTRIES, LTD., Osaka (JP)

(72) Inventors: Yuki Handa, Osaka (JP); Takuro Ogawa, Osaka (JP); Nobuo Hayashi, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 210 days.

(21) Appl. No.: 18/547,940

(22) PCT Filed: Mar. 30, 2022

(86) PCT No.: PCT/JP2022/016216
§ 371 (c)(1),
(2) Date: Aug. 25, 2023

(87) PCT Pub. No.: WO2022/210950
PCT Pub. Date: Oct. 6, 2022

(65) Prior Publication Data
US 2024/0136949 A1 Apr. 25, 2024
US 2024/0235424 A9 Jul. 11, 2024

(30) Foreign Application Priority Data
Mar. 31, 2021 (JP) .................................. 2021-061704

(51) Int. Cl.
*H02M 7/5387* (2007.01)
*H02M 1/00* (2006.01)
(Continued)

(52) U.S. Cl.
CPC ..... *H02M 7/53871* (2013.01); *H02M 1/0058* (2021.05); *H02M 1/126* (2013.01); *H02M 7/4815* (2021.05)

(58) Field of Classification Search
CPC ........... H02M 7/53872; H02M 7/4815; H02M 1/0058; H02M 1/126
See application file for complete search history.

(56) References Cited

U.S. PATENT DOCUMENTS 9,246,398 B2 * 1/2016 Sakakibara ............. H02M 1/15
9,401,656 B2 * 7/2016 Ohta ...................... H02M 5/458
(Continued)

FOREIGN PATENT DOCUMENTS

JP 2005-253282 9/2005

OTHER PUBLICATIONS

International Preliminary Report on Patentability for PCT/JP2022/016216 mailed on Oct. 12, 2023.
(Continued)

*Primary Examiner* — Adolf D Berhane
(74) *Attorney, Agent, or Firm* — IPUSA, PLLC

(57) ABSTRACT

A power conversion apparatus includes:
a converter configured to convert AC power that is input from an AC power supply via a first conductive line pair, into DC power;
an inverter configured to convert the DC power that is output from the converter to a second conductive line pair, into the AC power; and
a capacitor connected between conductive lines of the first conductive line pair or between conductive lines of the second conductive line pair, between one or more reactors and the inverter,
wherein, letting a carrier frequency for driving the inverter be $f_C$, a resonance frequency of an LC filter
(Continued)

constituted by the one or more reactors and the capacitor be $f_{LC}$, and a maximum value of an output frequency of the inverter be $MAX(f_0)$, $MAX(f_0)$ satisfies 6 times $MAX(f_0) < f_{LC} < f_c - 3$ times $MAX(f_0)$.

13 Claims, 15 Drawing Sheets

(51) Int. Cl.
*H02M 1/12* (2006.01)
*H02M 7/48* (2007.01)

(56) References Cited

U.S. PATENT DOCUMENTS

| | | | |
|---|---|---|---|
| 10,110,114 B2* | 10/2018 | MacLennan | H01F 27/18 |
| 10,680,547 B2* | 6/2020 | Xiao | H02M 1/126 |
| 2009/0178424 A1 | 7/2009 | Hwang et al. | |
| 2014/0328091 A1 | 11/2014 | Sakakibara et al. | |
| 2015/0256095 A1 | 9/2015 | Ohta | |
| 2020/0083820 A1 | 3/2020 | Yuasa et al. | |

OTHER PUBLICATIONS

International Search Report for PCT/JP2022/016216 mailed on Jun. 14, 2022.
Extended European search report mailed on Feb. 12, 2025 with respect to the corresponding European patent application No. 22781160.1.

* cited by examiner

EMBODIMENT
((CARRIER FREQUENCY − COMPONENT THAT IS THREE TIMES OUTPUT FREQUENCY) APPEARS AT A DISTANCE FROM RESONANCE FREQUENCY)

| | EMBODIMENT | COMPARATIVE EXAMPLE |
|---|---|---|
| POWER SUPPLY VOLTAGE/POWER SUPPLY FREQUENCY OF AC POWER SUPPLY 6 | 380 V/50 Hz | 380 V/50 Hz |
| CARRIER FREQUENCY $f_C$ | 20 kHz | 20 kHz |
| INDUCTANCE L OF REACTOR 8 | 60 μH | 500 μH |
| CAPACITANCE C OF CAPACITOR 3a | 15 μF | 10 μF |
| RESONANCE FREQUENCY $f_{LC}$ OF LC FILTER | 5.3 kHz | 2.2 kHz |
| OUTPUT FREQUENCY OF INVERTER CIRCUIT 4 | 420 Hz | 420 Hz |

FIG.15

| | EMBODIMENT | COMPARATIVE EXAMPLE |
|---|---|---|
| POWER SUPPLY VOLTAGE/POWER SUPPLY FREQUENCY OF AC POWER SUPPLY 6 | 380 V/60 Hz | 380 V/60 Hz |
| CARRIER FREQUENCY $f_C$ | 24 kHz | 5.9 kHz |
| INDUCTANCE L OF REACTOR 8 | 90 $\mu$H | 90 $\mu$H |
| CAPACITANCE C OF CAPACITOR 3a | 15 $\mu$F | 10 $\mu$F |
| RESONANCE FREQUENCY $f_{LC}$ OF LC FILTER | 4.3 kHz | 4.3 kHz |
| OUTPUT FREQUENCY OF INVERTER CIRCUIT 4 | 360 Hz | 360 Hz |

POWER CONVERSION APPARATUS, AIR CONDITIONER AND REFRIGERATION APPARATUS

TECHNICAL FIELD

The present disclosure relates to a power conversion apparatus, an air conditioner, and a refrigeration apparatus.

BACKGROUND

Conventionally, in order to satisfy power supply harmonic standards, there is a power conversion apparatus that sets the resonance frequency of an LC filter in a frequency band that is greater than 40 times the power supply frequency for which there is no power supply harmonic standard (see, for example, Patent Document 1).

RELATED-ART DOCUMENT

Patent Document

Patent Document 1: Unexamined Japanese Patent Application Publication No. 2005-253282

SUMMARY OF THE INVENTION

Problem to be Solved by the Invention

However, even if the resonance frequency of an LC filter is set to be greater than 40 times the power supply frequency, if harmonic components near the resonance frequency appear in a reactor or a capacitor, the signal might be amplified excessively due to the frequency characteristics of the LC filter.

The present disclosure therefore provides a power conversion apparatus that can mitigate the amplification of harmonic components by an LC filter, and an air conditioner having the power conversion apparatus.

Means for Solving the Problem

The present disclosure provides a power conversion apparatus that has:
a converter configured to convert AC power that is input from an AC power supply via a first conductive line pair, into DC power;
an inverter configured to convert the DC power that is output from the converter to a second conductive line pair, into the AC power; and
a capacitor connected between conductive lines of the first conductive line pair or between conductive lines of the second conductive line pair, and,
letting an inductance of an inductance component from a point where the power conversion apparatus is connected to the AC power supply, to the capacitor, be L, and a maximum value of output frequency of the inverter be MAX($f_0$), C, which is a capacitance of the capacitor, satisfies $$C < \frac{1}{144\pi^2 \times \{MAX(f_0)\}^2 \times L}. \quad \text{Equation 2}$$

By this means, it is possible to mitigate the amplification of harmonic components by the LC filter.

In the above power conversion apparatus, letting a carrier frequency for driving the inverter be $f_c$, a gain of an LC filter constituted by the inductance component and the capacitor at the carrier frequency $f_c$ may be 0.1 or less.

By this means, the gain of the LC filter at the carrier frequency $f_c$ is −20 dB (0.1 times) or less, so that the LC filter can mitigate the amplification of harmonic components of the carrier frequency band.

In the above power conversion apparatus, the gain of the LC filter constituted by the inductance component and the capacitor at 6 times MAX($f_0$) may be 5or less.

By this means, it is possible to prevent harmonic components on the lower frequency side with respect to the resonance frequency $f_{LC}$ of the LC filter from being amplified by the LC filter.

In the above power conversion apparatus,
the inductance component may include:
one or more reactors inserted in series into one or both of conductive lines of the first conductive line pair or into one or both of conductive lines of the second conductive line pair, and
the capacitor may be connected between the conductive lines of the first conductive line pair or between the conductive lines of the second conductive line pair, between the one or more reactors and the inverter.

By this means, the amplification of harmonic components by the LC filter constituted by the reactors and the capacitor can be mitigated.

The present disclosure provides a power conversion apparatus that has:
a converter configured to convert AC power that is input from an AC power supply via a first conductive line pair, into DC power;
an inverter configured to convert the DC power that is output from the converter to a second conductive line pair, into the AC power;
one or more reactors inserted in series in one or both of conductive lines of the first conductive line pair or one or both of conductive lines of the second conductive line pair; and
a capacitor connected between the conductive lines of the first conductive line pair or between the conductive lines of the second conductive line pair, between the one or more reactors and the inverter, and,
letting a carrier frequency for driving the inverter be $f_c$, a resonance frequency of an LC filter constituted by the one or more reactors and the capacitor be $f_{LC}$, and a maximum value of an output frequency of the inverter be MAX($f_0$), MAX ($f_0$) satisfies $$6 \times MAX(f_0) \leq f_{LC} \leq f_c - 3 \times MAX(f_0) \quad \text{Equation 1}$$

By this means, the amplification of harmonic components by the LC filter can be mitigated.

In the above power conversion apparatus, a gain of the LC filter at the carrier frequency $f_c$ may be 0.1 or less.

By this means, the gain of the LC filter at the carrier frequency $f_c$ becomes −20 dB (0.1 times) or less, so that the LC filter can mitigate the amplification of harmonic components of the carrier frequency band.

In the above power conversion apparatus, a gain of the LC filter at 6 times MAX($f_0$) may be 5 or less.

By this means, it is possible to prevent harmonic components on the lower frequency side with respect to the resonance frequency $f_{LC}$ of the LC filter from being amplified by the LC filter.

In the above power conversion apparatus, the one or more reactors may be components mounted on a substrate.

When the capacitance C satisfies equation 2 or MAX($f_o$) satisfies equation 1, the carrier frequency $f_c$ is then set to a relatively large value. As the carrier frequency $f_c$ increases, the inductance of the reactor can be made lower, so that the reactor can be made smaller. By making the reactors small, the reactors can be mounted on a substrate more easily. Therefore, by making the inductance small, even if the reactors easily heat up, it is still possible to dissipate the heat to the substrate, thereby mitigating the temperature rise of the reactors.

In the above power conversion apparatus, the capacitor may be connected between conductive lines of the second conductive line pair.

By this means, it is possible to mitigate the amplification of harmonic components by the LC filter including the capacitor connected between the conductive lines of the second conductive line pair. Also, the capacitor that is connected between the conductive lines of the second conductive line pair can absorb the surge voltage caused by the switching of the inverter.

In the above power conversion apparatus, MAX($f_o$) may be 600 Hz.

By this means, the resonance frequency $f_{LC}$ of the LC filter becomes greater than 3.6 kHz (=6 times 600 Hz), so that it is possible to mitigate the amplification of harmonic components of frequencies lower than 3.6 kHz, by the LC filter. In particular, 600 Hz is the upper limit of output frequency according to list control, so that list control can be satisfied.

In the above power conversion apparatus, a switching element provided in the inverter may be a wide band gap semiconductor device.

By using a wide band gap semiconductor for the switching element, the loss reduction effect of the switching element improves.

The present disclosure provides an air conditioner with the power conversion apparatus described above.

By this means, it is possible to realize an air conditioner that can mitigate the amplification of harmonic components by the LC filter.

The present disclosure provides a refrigeration apparatus with the above power conversion apparatus described above.

By this means, it is possible to realize a refrigeration apparatus that can mitigate the amplification of harmonic components by the LC filter.

BRIEF DESCRIPTION OF THE DRAWINGS

FIG. 14 is a diagram that illustrates the conditions upon the simulations of FIG. 6 to FIG. 9; and FIG. 15 is a diagram that illustrates the conditions upon the simulations of FIG. 10 to FIG. 13.

DETAILED DESCRIPTION OF THE INVENTION

Embodiments will be described below.

Figure 1:
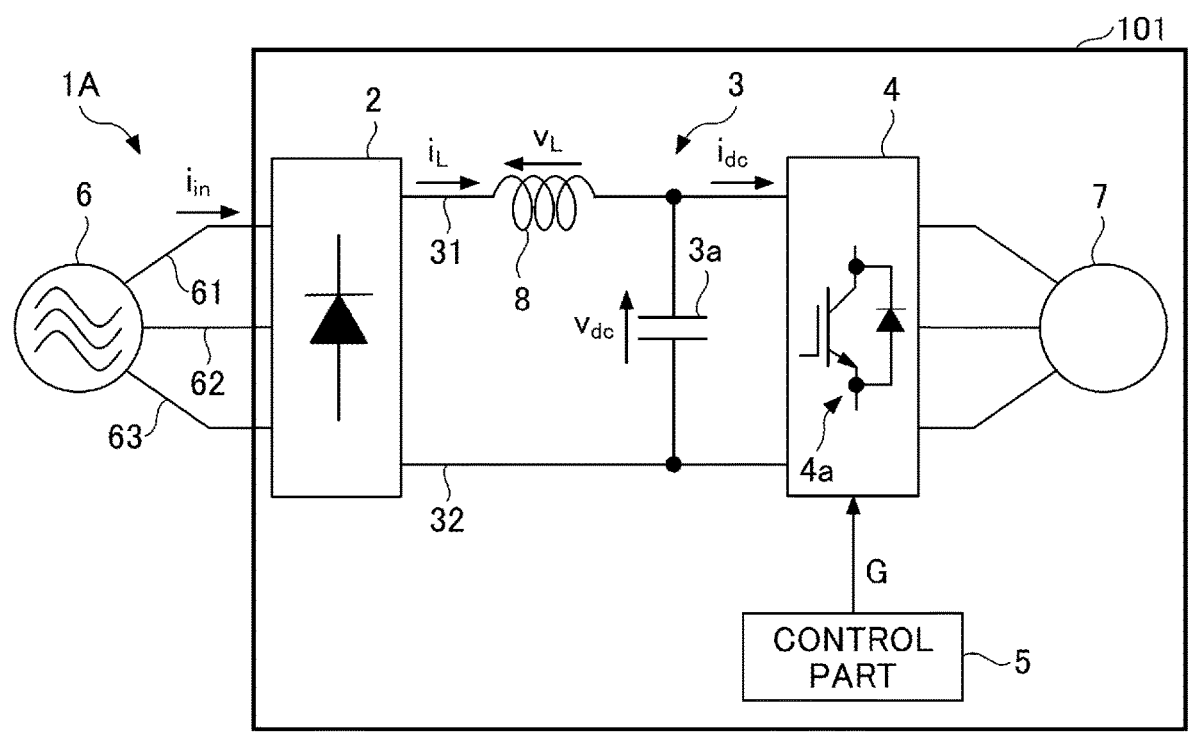
FIG. 1 is a diagram that illustrates a first example structure of a power conversion apparatus.

FIG. 1 is a diagram that illustrates a first example structure of a power conversion apparatus to which the technique disclosed in the present disclosure is applied. The power conversion apparatus 1A illustrated in FIG. 1 has a converter circuit 2, a DC link part 3, an inverter circuit 4, and a control part 5, and converts input AC power, which is supplied from a three-phase AC power supply 6, into output AC power with a predetermined voltage and a predetermined frequency, and supplies this to a motor 7.

The power conversion apparatus 1A is provided, for example, in an air conditioner 101 that conditions the air in the target space. The equipment on which the power conversion apparatus 1A is mounted is by no means limited to an air conditioner, and may be any other equipment that requires a power conversion function. The air conditioner 101 is an example of a refrigeration apparatus (refrigeration cycle apparatus) having a compressor that is driven by the motor 7.

The motor 7 is, for example, a three-phase AC motor. A specific example of the motor 7 may be a motor that drives a compressor provided in the refrigerant circuit of the air conditioner 101. The motor 7 is, for example, a concentrated winding motor such as a 4-pole, 6-slot motor or a 6-pole, 9-slot motor. This motor 7 tends to include many 5th and 7th-order components of the fundamental wave as harmonic components of the induced voltage. Higher-order (for example, sixth-order) harmonic components resulting from this motor voltage's distortions (5th and 7th-order harmonic components of the fundamental wave) might appear in the input power of the motor 7 and the input side of the inverter circuit 4. These high-order harmonic components may appear in, for example, a power supply current $i_{in}$ of the AC power supply 6, a DC link voltage $v_{dc}$ in a DC link part 3, a reactor voltage $v_L$ across a reactor 8, a reactor current $i_L$ that flows in the reactor 8, or a DC current $i_{dc}$ that flows in the DC link part 3.

The converter circuit 2 is an example of a converter that converts the three-phase AC power that is input from the AC power supply 6, via a plurality of conductive lines 61, 62, and 63, into DC power. In the example illustrated in FIG. 1, the three-phase AC power supplied from the AC power supply 6 is input to an input part of the converter circuit 2 via three conductive lines 61, 62, and 63 (that is, three sets of conductive line pairs including a conductive line pair 61 and 62, a conductive line pair 62 and 63, and a conductive line pair 61 and 63). At least one of the three conductive line pairs including the conductive line pair 61 and 62, the conductive line pair 62 and 63, and the conductive line pair 61 and 63, is an example of the first conductive line pair that is provided between the AC power supply 6 and the converter circuit 2.

The converter circuit 2 is connected to the AC power supply 6, and converts the AC power that is output from the AC power supply 6, into DC power. The converter circuit 2 is, for example, a diode bridge circuit, in which a plurality of (six in this example) diodes are connected in a bridge-like shape. These diodes full-wave rectify the AC voltage of the AC power supply 6 and convert it to a DC voltage. The converter circuit 2 may be a voltage conversion circuit of a circuit type other than a diode bridge circuit, as long as it is a circuit that supplies the DC power after conversion to the inverter circuit 4 via the DC link part 3.

The DC link part 3 has a capacitor 3a that is connected between the converter circuit 2 and the inverter circuit 4. The capacitor 3a is connected in parallel to an output part of the converter circuit 2, and the DC voltage (DC link voltage $v_{dc}$) generated across the capacitor 3a is input to an input node of the inverter circuit 4. The capacitor 3a is connected between a conductive line pair 31 and 32. Of the conductive line pair 31 and 32, one conductive line 31 is a positive bus, and the other conductive line 32 is a negative bus. The conductive line pair 31 and 32 is an example of a second conductive line pair.

The DC link part 3 has the reactor 8, which is connected between the converter circuit 2 and the inverter circuit 4. The reactor 8 is inserted in series in the DC bus between the output part of the converter circuit 2 and the input part of the inverter circuit 4. In the example illustrated in FIG. 1, the reactor 8 is inserted in series in the conductive line 31 of the conductive line pair 31 and 32, which is a pair of DC buses. The reactor 8 may be inserted in series in the conductive line 32, or may be inserted in series in both conductive lines of the conductive line pair 31 and 32. The reactor 8 may be inserted in series in all of the conductive lines 61, 62, and 63.

Note that a "conductive line" refers to a path through which a current travels, and does not simply mean a conductive wire. For example, the conductive line 32 may be a grounded conductive part, or may be a heat sink for dissipating heat from the inverter circuit 4.

The inverter circuit 4 is an example of an inverter that converts the DC power that is output from the converter circuit 2 to the conductive line pair 31 and 32, into AC power.

The inverter circuit 4 has its input node connected in parallel to the capacitor 3a of the DC link part 3, converts the DC power into three-phase AC power by switching the output of the DC link part 3, and supplies the three-phase AC power to the motor 7 that is connected. The inverter circuit 4 of this embodiment is formed by connecting a plurality of switching elements 4a in a bridge-like shape. Since this inverter circuit 4 outputs three-phase AC power to the motor 7, it has six switching elements. To be more specific, the inverter circuit 4 has three switching legs connected in parallel with each other, each switching leg having two switching elements that are connected in series with each other. In each switching leg, the midpoint between the upper arm switching element and the lower arm switching element is connected to each phase coil of the motor 7. Also, a freewheeling diode is connected in anti-parallel to each switching element. By turning on and off these switching elements, the inverter circuit 4 switches the DC link voltage $v_{dc}$ input from the DC link part 3 and converts it into a three-phase AC voltage, and supplies this three-phase AC voltage to the motor 7. Note that the control part 5 controls this on/off operation.

The switching element 4a is preferably a device containing a wide band gap semiconductor such as silicon carbide (SiC), gallium nitride (GaN), gallium oxide ($Ga_2O_3$), diamond, and so forth. By applying a wide band gap semiconductor to the switching elements, the loss reduction effect of the switching elements improves. Note that an element containing a semiconductor such as silicon (Si) may be used for the switching elements. Similarly, by applying an element containing a wide band gap semiconductor to the diode connected in anti-parallel to the switching element 4a, the diode has an improved effect of reducing loss. Note that the diode may be an element containing a semiconductor such as silicon (Si). Similarly, each switching element may be a unipolar transistor containing a wide band gap semiconductor. In this case, if the body diode of the unipolar transistor is used as a freewheeling diode, the diode to be connected in anti-parallel need not be provided.

The control part 5 controls the switching (on/off operation) of the inverter circuit 4. The control part 5 is, for example, a control circuit having a processor such as a central processing unit (CPU), and a memory. The functions of the control part 5 may be implemented as the processor operates according to a program that is stored in the memory in a readable fashion. The functions of the control part 5 may be realized by a field programmable gate array (FPGA) or an application-specific integrated circuit (ASIC).

Figure 2:
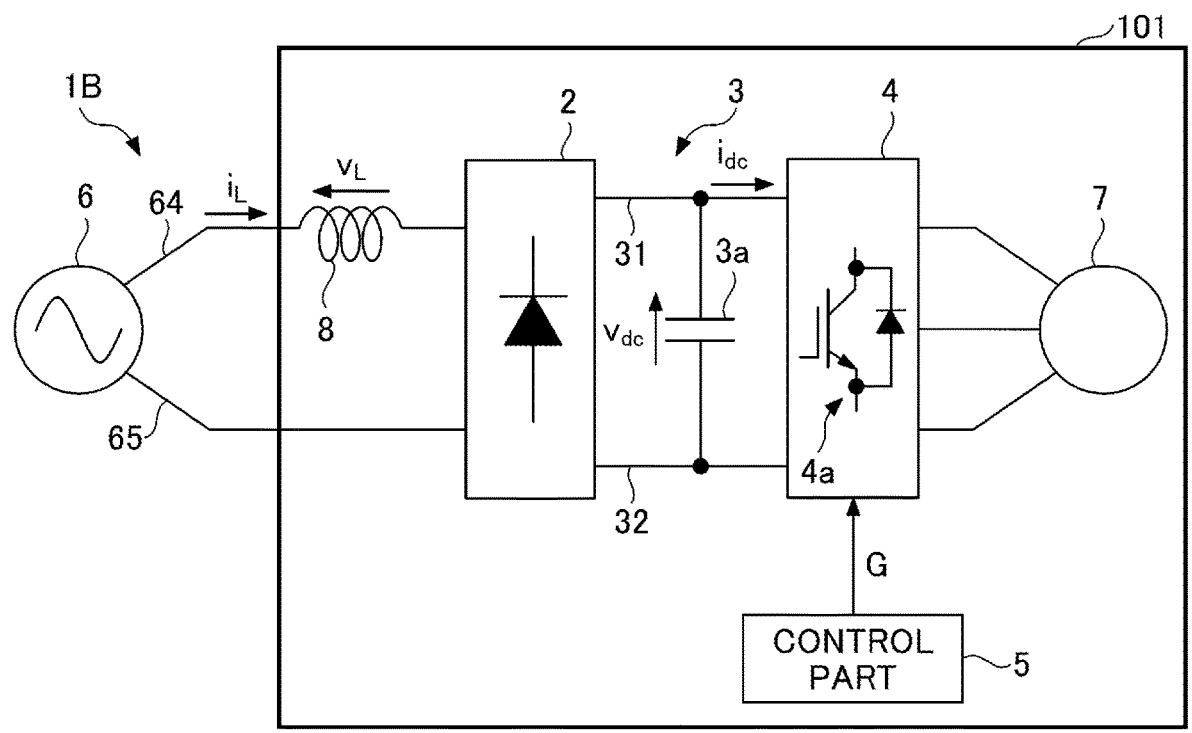
FIG. 2 is a diagram that illustrates a second example structure of a power conversion apparatus.

FIG. 2 is a diagram that illustrates a second example structure of a power conversion apparatus to which the technique disclosed in the present disclosure is applied. Description of the same components as in the first example structure will be omitted by citing the description given hereinbefore. The power conversion apparatus 1B illustrated in FIG. 2 has a converter circuit 2, a DC link part 3, an inverter circuit 4, and a control part 5. The power conversion apparatus 1B converts the input AC power supplied from a single-phase AC power supply 6, into output AC power having a predetermined voltage and a predetermined frequency, and supplies this output AC power to a motor 7.

The converter circuit 2 is an example of a converter that converts the single-phase AC, input from the AC power supply 6 via a plurality of conductive lines 64 and 65, into DC power. In the example illustrated in FIG. 2, the single-phase AC power supplied from the AC power supply 6 is input to an input part of the converter circuit 2 via two conductive lines 64 and 65 (which form one conductive line pair 64 and 65).

The converter circuit 2 is connected to the AC power supply 6 via the reactor 8, and rectifies (converts) the AC power that is output from the AC power supply 6, into DC power. The converter circuit 2 is, for example, a diode bridge circuit in which a plurality of (four in this example) diodes are connected in a bridge-like shape. These diodes full-wave rectify the AC voltage of the AC power supply 6 and convert it to a DC voltage. The converter circuit 2 may be a voltage conversion circuit of a circuit type other than a diode bridge circuit, as long as it is a circuit that supplies the DC power after conversion to the inverter circuit 4 via the DC link part 3.

The reactor 8 is connected between the AC power supply 6 and the converter circuit 2. To be more specific, the reactor 8 is inserted in series between the AC output side of the AC power supply 6 and the AC input side of the converter circuit 2. In the example illustrated in FIG. 2, the reactor 8 is inserted in series in the conductive line 64, which is one conductive line of the conductive line pair 64 and 65. The reactor 8 may also be inserted in series in the conductive line 65, or may be inserted in both conductive lines of the conductive line pair 64 and 65. The reactor 8 may be inserted in series in one conductive line or both conductive lines of the conductive line pair 31 and 32.

Referring to FIG. 1 and FIG. 2, the capacitance value of the capacitor 3a is configured such that, although the output of the converter circuit 2 can be smoothed out only slightly, the ripple voltage that arises from the switching operation of the inverter circuit 4 (voltage fluctuation in accordance with the switching frequency $f_c$) can be mitigated. To be more specific, the capacitor 3a is composed of a small-capacitance capacitor (for example, a film capacitor that has a capacitance value (for example, several tens to several hundred µF) approximately 0.01 times that of a smoothing capacitor (for example, an electrolytic capacitor) that is used to smooth out the output of the converter circuit 2 in a general power conversion apparatus.

Since the capacitance value of the capacitor 3a is so small, the output of the converter circuit 2 is smoothed out only slightly in the DC link part 3. As a result of this, pulsating components that correspond to the frequency of the power supply voltage $v_{in}$ of the AC power supply 6 remain in the DC voltage (DC link voltage $v_{dc}$). For example, the DC link voltage $v_{dc}$ has a pulsating component with a frequency six times the frequency of the power supply voltage $v_{in}$ in the event the three-phase AC power supply 6 of FIG. 1 is used, and has a pulsating component at twice the frequency of the power supply voltage $v_{in}$ in the event the single-phase AC power supply 6 of FIG. 1 is used.

Referring to FIG. 1 and FIG. 2, the reactor 8 and the capacitor 3a constitute the LC filter.

In the example illustrated in FIG. 1, the reactor 8 is arranged in series in the conductive line 31, and the capacitor 3a is connected between conductive line pair 31 and 32 between the reactor 8 and the inverter circuit 4, thereby constituting the LC filter together. The LC filter may also be constituted by a reactor 8 that is arranged in series in the conductive line 32 and a capacitor 3a that is connected between the conductive line pair 31 and 32 between the reactor 8 and the inverter circuit 4. The LC filter may also be constituted by reactors 8 that are arranged in series in both conductive lines of the conductive line pair 31 and 32, and a capacitor 3a that is connected between the conductive line pair 31 and 32 between the reactors 8 and the inverter circuit 4. The capacitors that constitute the LC filter may include three interphase capacitors, namely the capacitor that is provided between the conductive line pair 61 and 62, the capacitor that is provided between the conductive line pair 62 and 63, and the capacitor that is provided between the conductive line pair 61 and 63. The reactors that constitute the LC filter may include a plurality of reactors that are arranged in series in each of the conductive lines 61, 62, and 63. The inductance to use to calculate the resonance frequency of the LC filter when reactors are arranged in series in all of the conductive lines 61, 62, and 63, is 2 times L, if the inductance of each reactor arranged in series in the conductive lines 61, 62, and 63 is L.

Referring to the example illustrated in FIG. 2, the reactor 8 is arranged in series in a conductive line 64, and the capacitor 3a is connected between conductive line pair 31 and 32 between the reactor 8 and the inverter circuit 4, thereby constituting the LC filter. The LC filter may be constituted by a reactor 8 that is arranged in series in the conductive line 65, and a capacitor 3a that is connected between the conductive line pair 31 and 32 between the reactor 8 and the inverter circuit 4. The LC filter may be constituted by reactors 8 that are arranged in series in both conductive lines of the conductive line pair 64 and 65, and a capacitor 3a that is connected between the conductive line pair 31 and 32 between the reactors 8 and the inverter circuit 4. The capacitors that constitute the LC filter may include a capacitor that is connected between the conductive line pair 64 and 65 between the reactors 8 and the converter circuit 2. The reactors that constitute the LC filter may include a reactor that is arranged in series in at least one conductive line of the conductive line pair 31 and 32.

Figure 3:
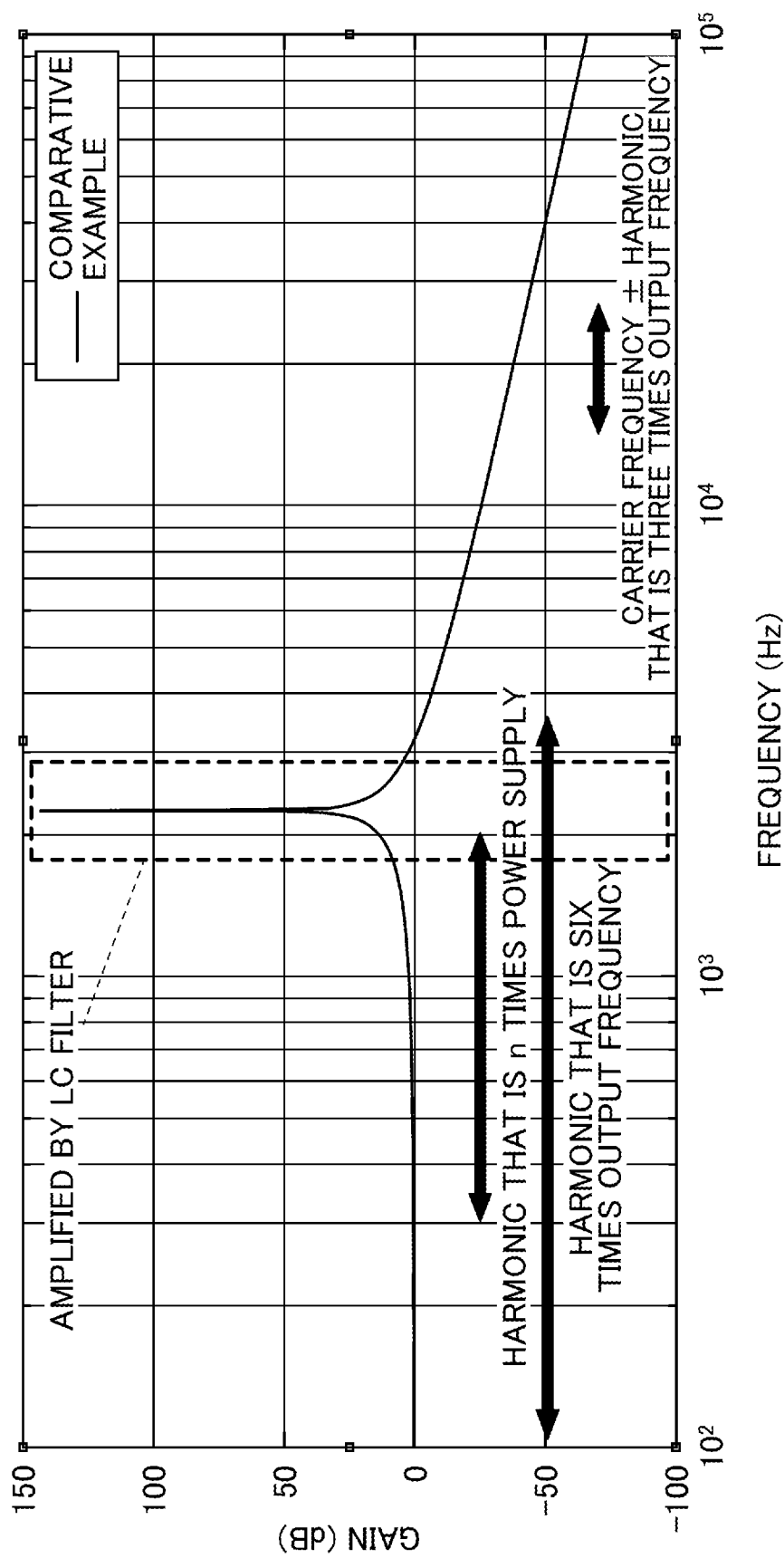
FIG. 3 is a diagram that illustrates an example of transfer characteristics of an LC filter.

FIG. 3 is a diagram that illustrates an example of transfer characteristics of an LC filter. The LC filter has a resonance frequency. If harmonic components near the resonance frequency of the LC filter appear in the reactor 8 or the capacitor 3a, the signal might be amplified excessively in accordance with the frequency characteristics of the LC filter. Excessive amplification of the signal might lead to, for example, abnormal heat generation in the reactor 8, excessive DC link voltage $v_{dc}$, and so forth.

Harmonic components that might appear in the DC link part 3 mainly include:
   a: a component that is n times the power supply frequency (n is an integer of 1 or more);
   b: a component that is six times the output frequency; and
   c: carrier frequency±(a component that is three times the output frequency), and so forth.

As illustrated in FIG. 3, the harmonic component a is determined by the power supply frequency of the AC power supply 6, and appears in the frequency band of 2 kHz or below. The harmonic component b is determined by the output frequency of the inverter circuit 4, and appears in a frequency band higher than the harmonic component a. The harmonic component c is determined by the carrier frequency and output frequency of the inverter circuit 4, and appears in a frequency band higher than the harmonic components a and b.

When such harmonic components a, b, and c appear near the resonance frequency of the LC filter, the signal is amplified in accordance with the frequency characteristics of the LC filter. The harmonic component b is determined by the output frequency of the inverter circuit 4, and the harmonic component c is determined by the carrier frequency and output frequency of the inverter circuit 4. Therefore, if, by increasing the carrier frequency, the LC filter is made smaller and the resonance frequency of the LC filter is raised, a region appears in which the harmonic components a, b, and c and the resonance of the LC filter are less likely to interfere with each other (see FIG. 4).

Figure 4:
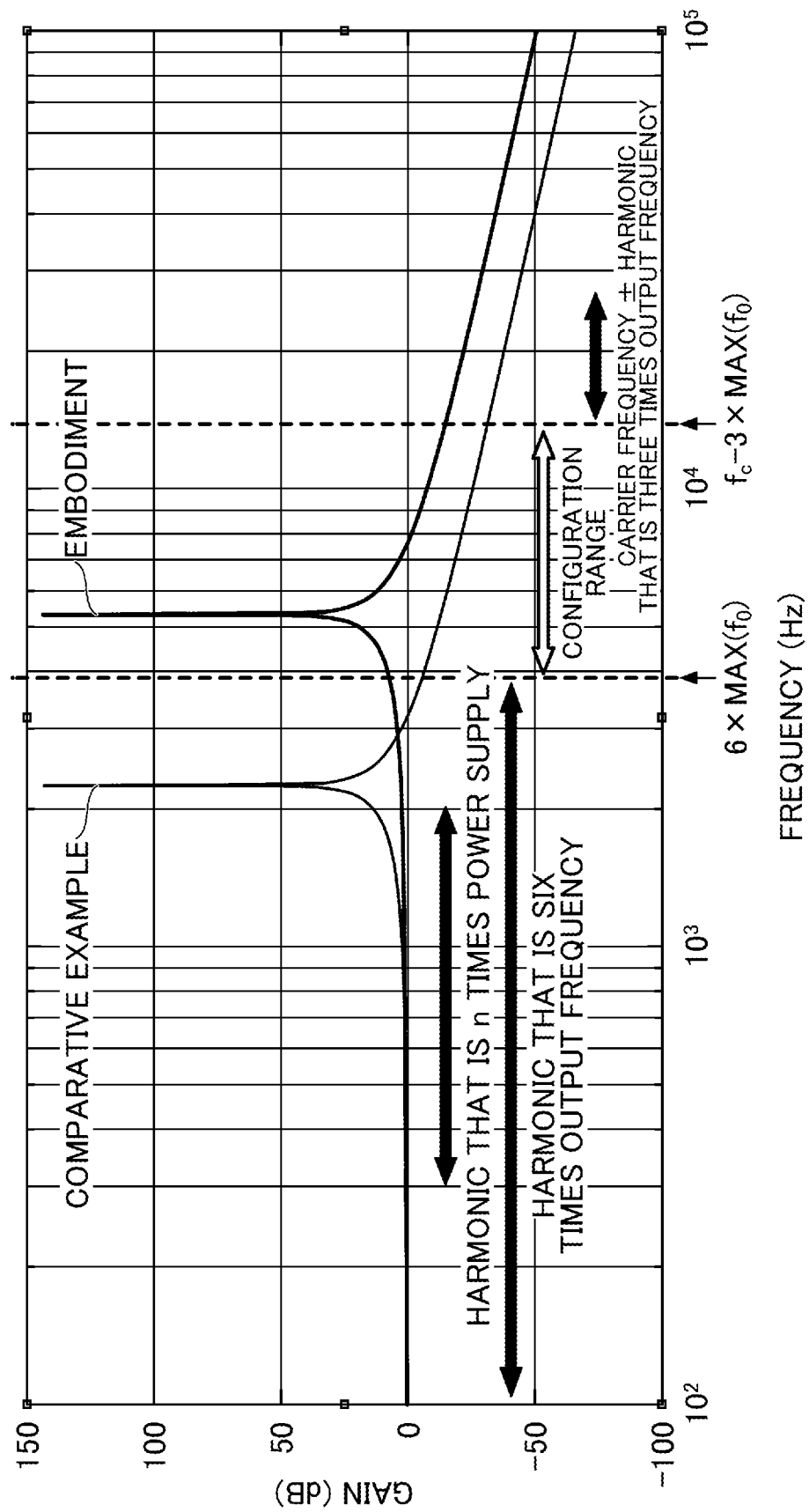
FIG. 4 is a diagram that illustrates an example range for setting an LC filter's resonance frequency.

FIG. 4 is a diagram that illustrates an example range for setting the resonance frequency of the LC filter. According to the technique of the present disclosure, the carrier frequency for driving the inverter circuit 4 is $f_c$, the resonance frequency of the LC filter constituted by the reactor 8 and the capacitor 3a is $f_{LC}$, and the maximum value of the output frequency of the inverter circuit 4 is MAX($f_0$). If MAX($f_0$) satisfies $$6 \times \text{MAX}(f_0) < f_{LC} < f_c - 3 \times \text{MAX}(f_0) \quad \text{Equation 1}$$

then, the characteristics of the LC filter can be set to a frequency band where harmonic components a, b, and c are not readily amplified.

Also, equation 1, when solved for MAX($f_0$), is modified as follows:

$$\text{MAX}(f_0) < \frac{1}{6} f_{LC}, \text{ and} \qquad \text{Equation 3}$$

$$\text{MAX}(f_0) < \frac{1}{3}(f_c - f_{LC}). \qquad \text{Equation 4}$$

Considering the relationship between the magnitudes of the right sides of equation 3 and equation 4, $$\tfrac{1}{3}(f_c - f_{LC}) - \tfrac{1}{6} f_{LC} = \tfrac{1}{3} f_c - \tfrac{1}{2} f_{LC} > 0 \Leftrightarrow f_c > \tfrac{3}{2} f_{LC} \qquad \text{Equation 5}$$

is obtained That is, within the range in which equation 5 holds, equation 4 always holds if equation 3 holds.

Letting the inductance of inductance components from the point where the power conversion apparatus 1A and the like is connected to the AC power supply 6 to the capacitor 3a be L, and the capacitance of the capacitor 3a be C, $$f_{LC} = \frac{1}{2\pi\sqrt{LC}} \qquad \text{Equation 6}$$

holds. The point where the power conversion apparatus is connected to the AC power supply 6 refers to, for example, AC input terminals of the power conversion apparatus 1A where a plurality of conductive lines 61, 62, and 63 are connected in the case of FIG. 1, and AC input terminals of the power conversion apparatus 1B where a plurality of conductive lines 64 and 65 are connected in the case of FIG. 2.

Therefore, solving equation 3 and equation 5 for inductance L by using the relation of equation 6 gives:

$$L < \frac{1}{144\pi^2 \times \{\text{MAX}(f_0)\}^2 \times C}, \text{ and} \qquad \text{Equation 7 ($\because$ Equation 3)}$$

$$L > \frac{9}{16\pi^2 \times f_c^2 \times C}. \qquad \text{Equation 8 ($\because$ Equation 5)}$$

Summarizing equation 7 and equation 8 for C, $$\frac{9}{16\pi^2 \times f_c^2 \times L} < C < \frac{1}{144\pi^2 \times \{\text{MAX}(f_0)\}^2 \times L} \qquad \text{Equation 9}$$

is obtained.

The lower limit of C in equation 9 is infinitely close to zero when the power supply impedance on the AC power supply 6 side is infinite when viewed from the power conversion apparatus. Since the power supply impedance differs from country to country, the lower limit of C in equation 9 can be any value.

Therefore, when the capacitance C of the capacitor 3a satisfies $$C < \frac{1}{144\pi^2 \times \{\text{MAX}(f_0)\}^2 \times L}, \qquad \text{Equation 2}$$

the characteristics of the LC filter can be set to a frequency band where the harmonic components a, b, and c are not readily amplified.

Since the carrier frequency and the output frequency are not considered in conventional art, there is a possibility that the resonance frequency of the LC filter is set in a region where above equation 1 or equation 2 does not hold. According to the technique of the present disclosure, the resonance frequency of the LC filter is set in a region where above equation 1 or equation 2 holds, so that it is possible to mitigate the amplification of harmonic components by the LC filter. As a result of this, abnormal generation of heat from the reactor 8, generation of excessive DC link voltage $V_{dc}$, and so forth can be mitigated.

Since the resonance frequency $f_{LC}$ is higher than 6 times MAX($f_0$), for example, the amplification of harmonic components by the LC filter can be mitigated without introducing additional circuitry or special controls. Since the resonance frequency $f_{LC}$ is lower than $f_c$–3 times MAX($f_0$), it is possible to mitigate the increase in circuit size due to, for example, addition of a noise filter necessitated by the increase of carrier frequency.

For example, MAX($f_0$) is set to 600 Hz. By this means, the resonance frequency $f_{LC}$ of the LC filter becomes greater than 3.6 kHz (=6 times 600 Hz), so that the amplification of harmonic components having frequencies lower than 3.6 kHz by the LC filter can be mitigated. In particular, 600 Hz is the upper limit of output frequency according to list control, so that list control can be satisfied.

For example, the gain of the LC filter at the carrier frequency $f_c$ is set to 0.1 or less. By this means, the gain of the LC filter at the carrier frequency fc becomes −20 dB (0.1 times) or less, so that the LC filter can reduce the harmonic components of the carrier frequency band. In order to improve the effect of reducing the harmonic components of the carrier frequency band by the LC filter, the gain of the LC filter at the carrier frequency $f_c$ is preferably 0.01 or less (−40 dB or less), and more preferably 0.001 or less (−60 dB or less).

For example, the gain of the LC filter at 6 times MAX($f_0$) is set to 5 or less. By this means, the gain of the LC filter at 6 times MAX($f_0$) becomes less than 14 dB (5 times). By this means, the effect of mitigating the amplification of harmonic components on the lower frequency side with respect to the resonance frequency $f_{LC}$ of the LC filter by the LC filter improves.

Figure 5:
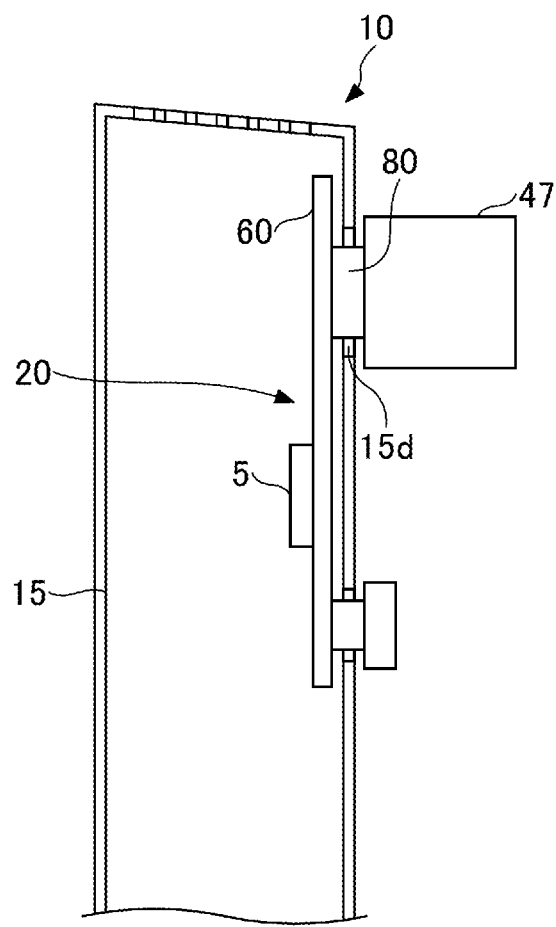
FIG. 5 is a cross-sectional view that partially illustrates an example structure of an electrical unit with power conversion apparatus.

FIG. 5 shows a longitudinal cross-sectional view of an electrical unit with a power conversion apparatus. The electrical unit 10 illustrated in FIG. 5 includes a box-shaped housing 15 and a power conversion apparatus 20 housed in the housing 15. The power conversion apparatus 20 is an example of, for example, the above power conversion apparatus 1A.

As described above, the power conversion apparatus 20 includes parts such as the converter circuit 2, the reactor 8, the capacitor 3a, the inverter circuit 4, the control part 5, and so forth.

These parts inside the power conversion apparatus 20 are mounted on a substrate 60. By this means, the heat of these components such as the reactor 8 can be dissipated to the substrate 60. The substrate 60 is fixed to the inner surface of the housing 15.

The substrate 60 is thermally coupled to a heat sink 47 via a thermally conductive coupling member 80, so that the heat of the substrate 60 can be dissipated from the heat sink 47. A through-hole 15d is formed in the housing 15 in the example illustrated in FIG. 5. The substrate 60 is thermally coupled to the heat sink 47, which is provided outside the housing 15, via a coupling member 80 that penetrates the through-hole 15d.

Next, the results of comparing the technique of the present disclosure and the technique of patent document I by using the power conversion apparatus 1A having the structure illustrated in FIG. 1 will be described with reference to FIG. 6 to FIG. 13. The technique of the present disclosure pertains to a case in which an LC filter's resonance frequency is set to satisfy equation 1 above, and the technique of patent document 1 pertains to a case in which an LC filter's resonance frequency is set to be greater than 40 times the power supply frequency.

Figure 6:
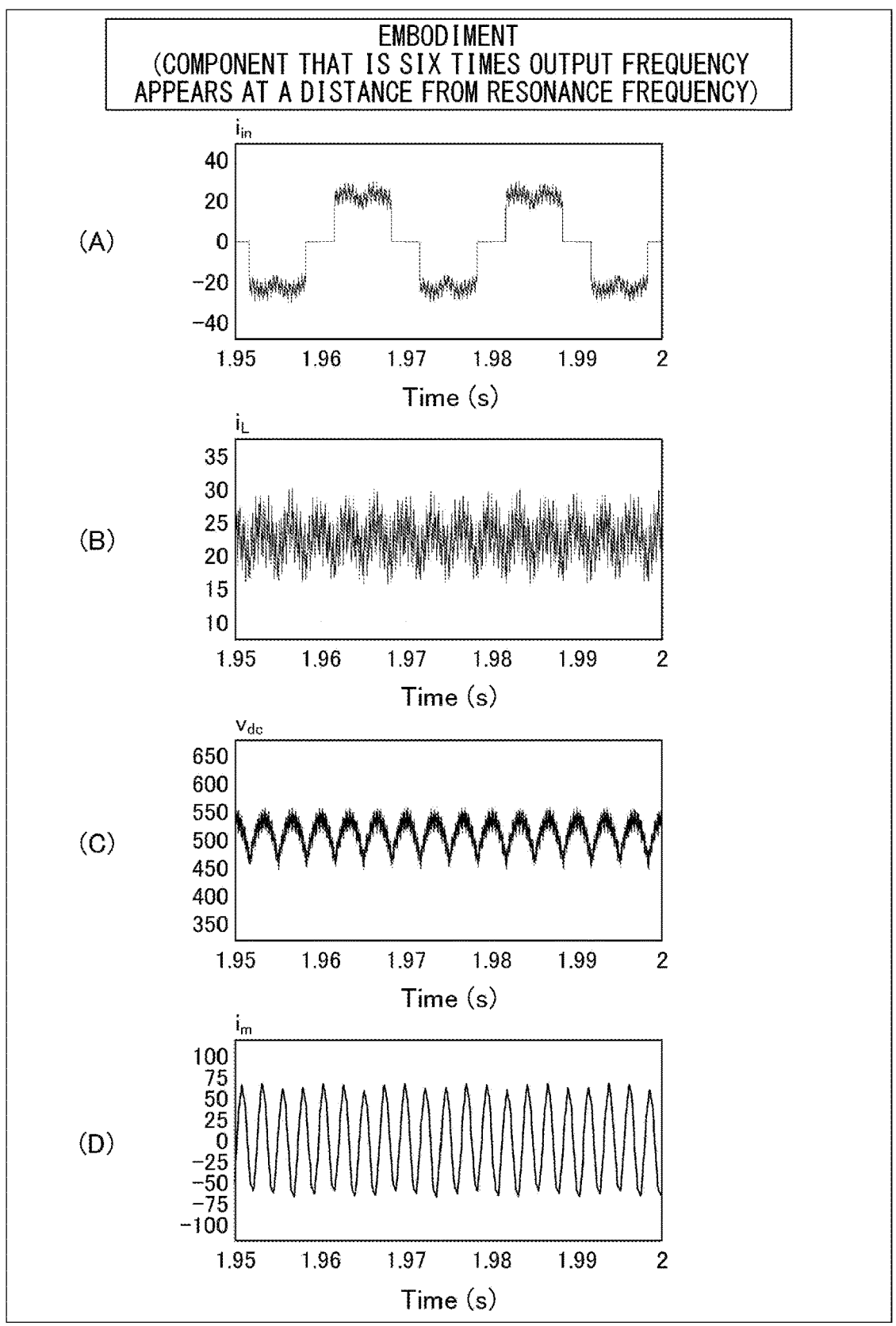
FIG. 6 is a diagram that illustrates simulation waveforms of respective parts according to an embodiment.
Figure 7:
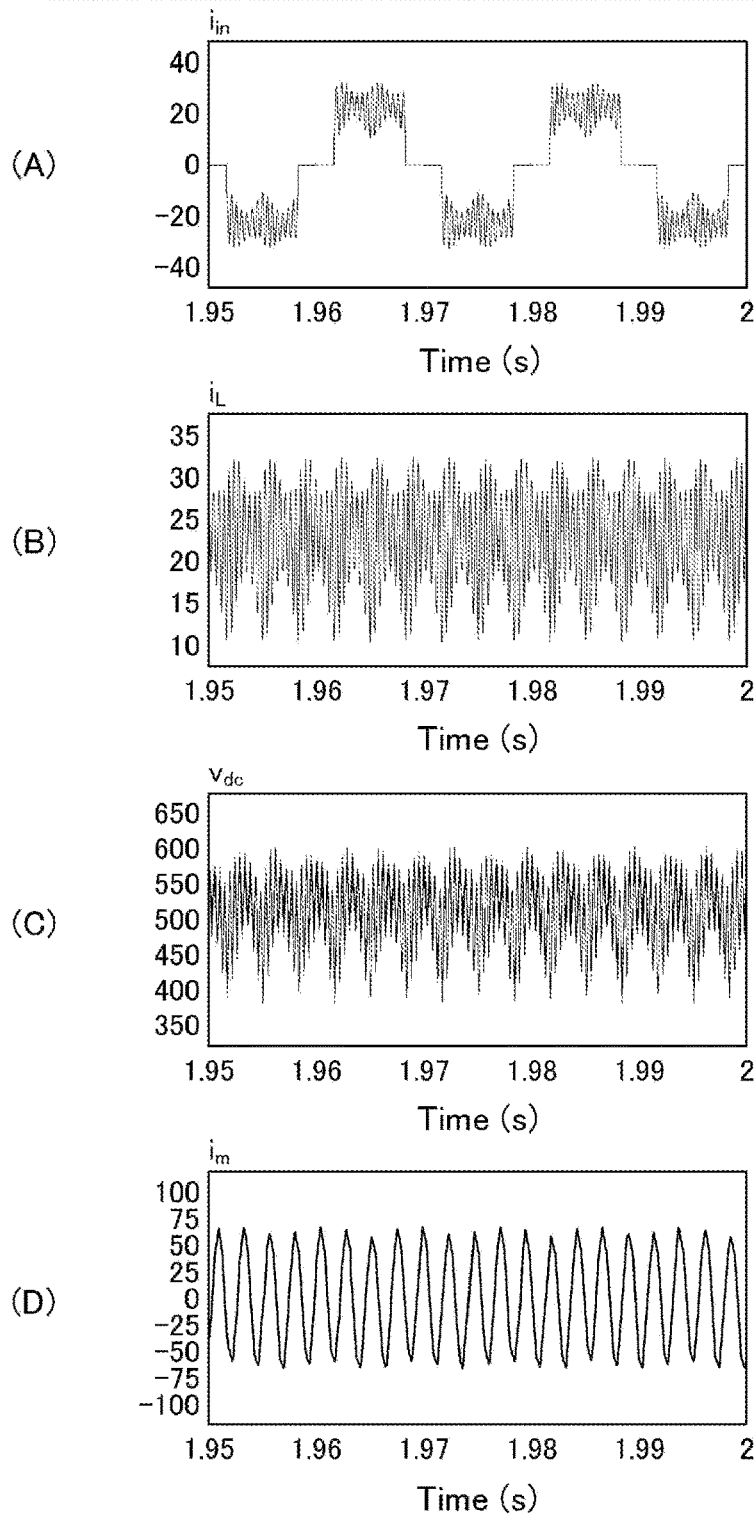
FIG. 7 is a diagram that illustrates simulation waveforms of respective parts according to a comparative example.
Figure 8:
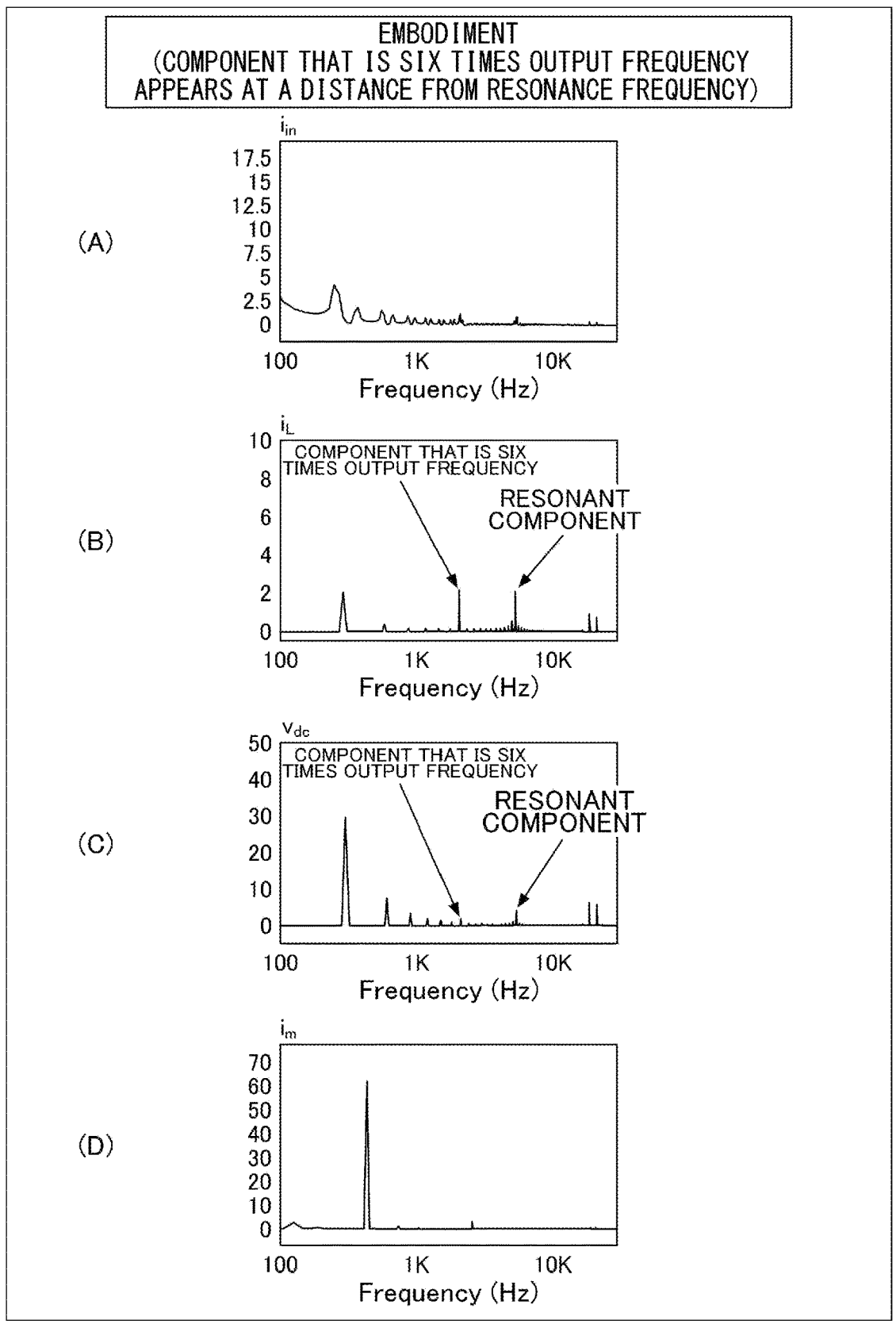
FIG. 8 is a diagram that illustrates frequency analysis results of simulation waveforms of respective parts according to an embodiment.
Figure 9:
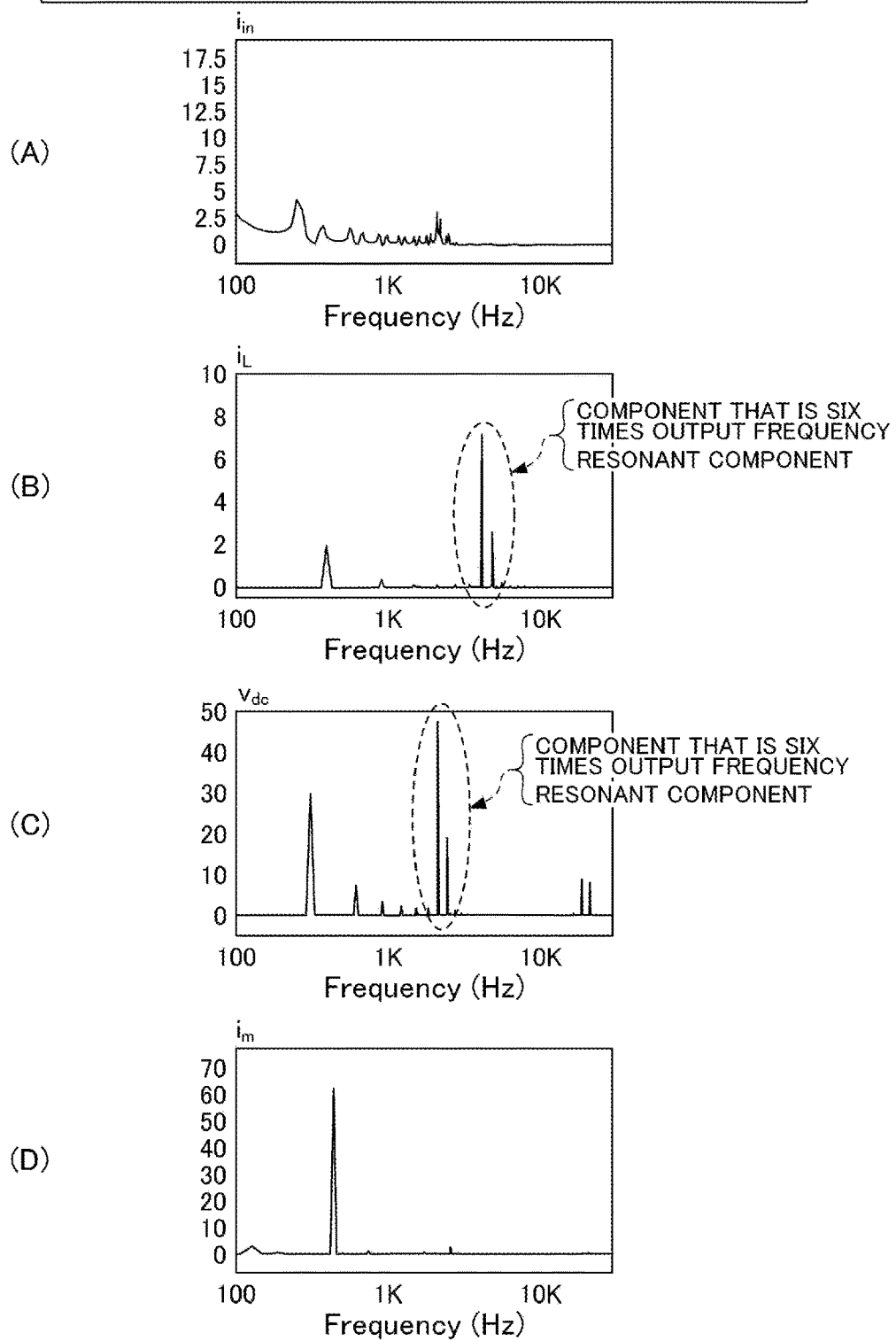
FIG. 9 is a diagram that illustrates frequency analysis results of simulation waveforms of respective parts according to a comparative example.

FIG. 6 to FIG. 9 show cases in which the harmonic component b (which is a component six times the output frequency) appears. FIG. 6 and FIG. 7 show the waveforms of the power supply current $i_{in}$ of the AC power supply 6, the reactor current $i_L$ that flows in the reactor 8, the DC link voltage $v_{dc}$ in the DC link part 3, and the motor current $i_m$ that flows in the motor 7. FIG. 6 illustrates an embodiment to which the technique of the present disclosure is applied, and FIG. 7 shows a comparative example to which the technique of patent document 1 is applied. FIG. 8 and FIG. 9 show frequency analysis results of the waveforms of the power supply current $i_{in}$ of the AC power supply 6, the reactor current $i_L$ that flows in the reactor 8, the DC link voltage $v_{dc}$ in the DC link part 3, and the motor current $i_m$ that flows in the motor 7, based on the fast Fourier transform. FIG. 8 illustrates an embodiment to which the technique of the present disclosure is applied, and FIG. 9 shows a comparative example to which the technique of patent document 1 is applied.

As illustrated in FIG. 9, according to the technique of patent document 1, the harmonic component b (a component six times the output frequency) and the resonance frequency of the LC filter are close to each other. Consequently, the harmonic component b (a component six times the output frequency) causes the LC filter's resonance, and harmonic components near the resonance frequency appear in a noticeable manner. On the other hand, as illustrated in FIG. 8, according to the technique of the present disclosure, the harmonic component b (a component six times the output frequency) is set to be substantially smaller than the resonance frequency of the LC filter, so that amplification of the harmonic component b (a component six times the output frequency) is mitigated. In this way, as illustrated in FIG. 6 and FIG. 7, the technique of the present disclosure reduces the harmonics superimposed on the power supply current $i_{in}$, the reactor current $i_L$, and the DC link voltage $v_{dc}$, compared to the technique of patent document 1. Note that the conditions upon the simulations of FIG. 6 to FIG. 9 are shown in FIG. 14.

Figure 10:
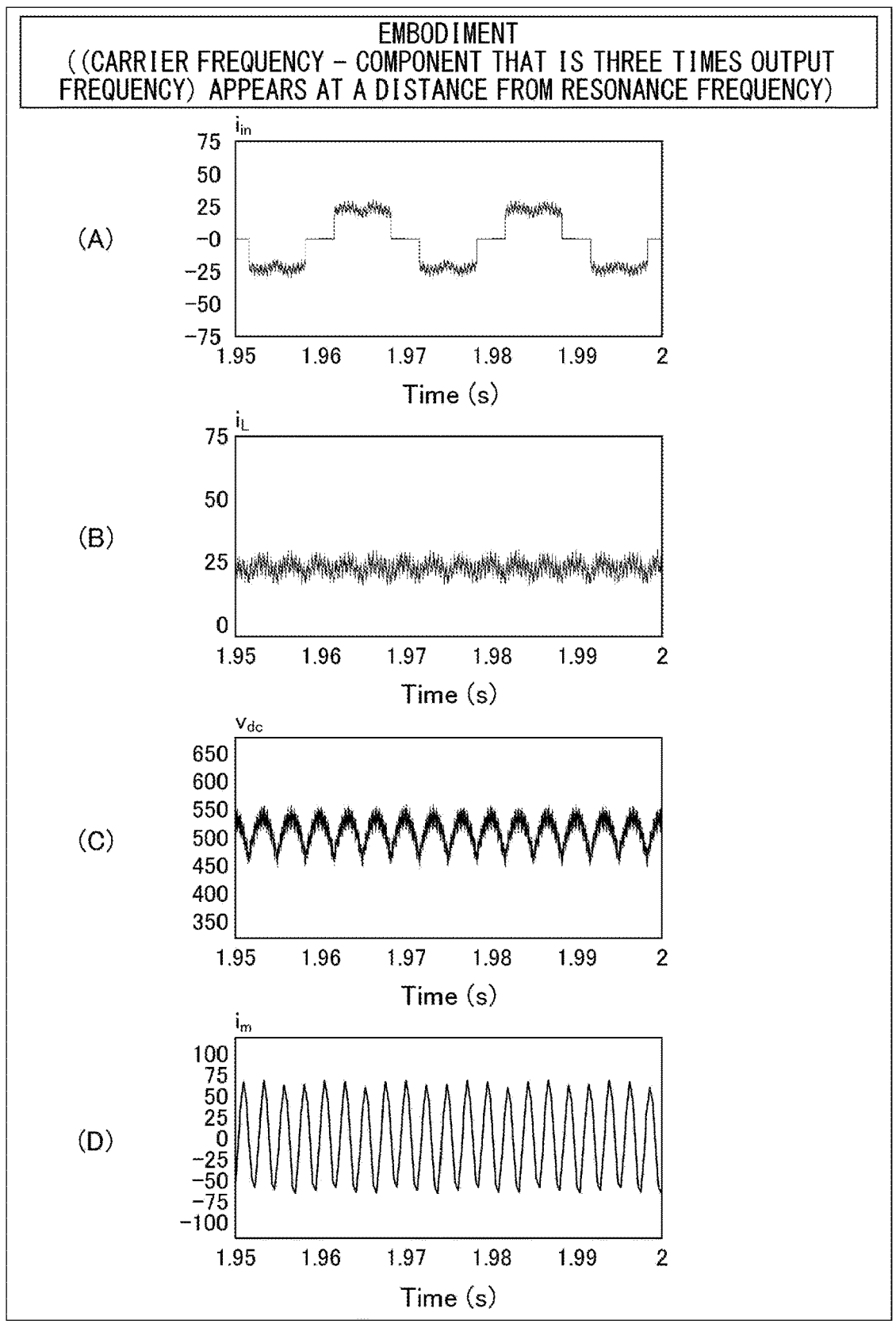
FIG. 10 is a diagram that illustrates simulation waveforms of respective parts according to an embodiment.
Figure 11:
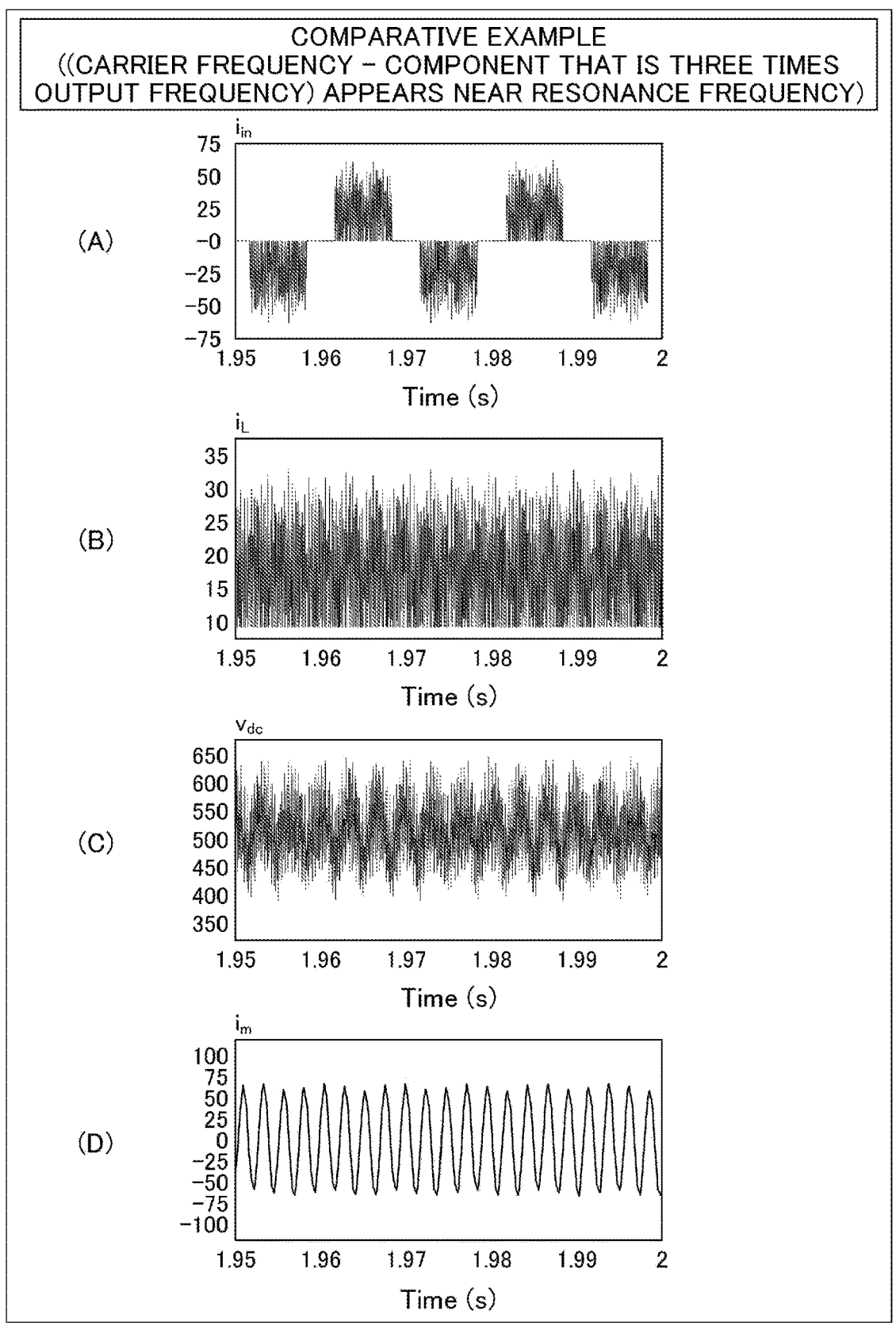
FIG. 11 is a diagram that illustrates simulation waveforms of respective parts according to a comparative example.
Figure 12:
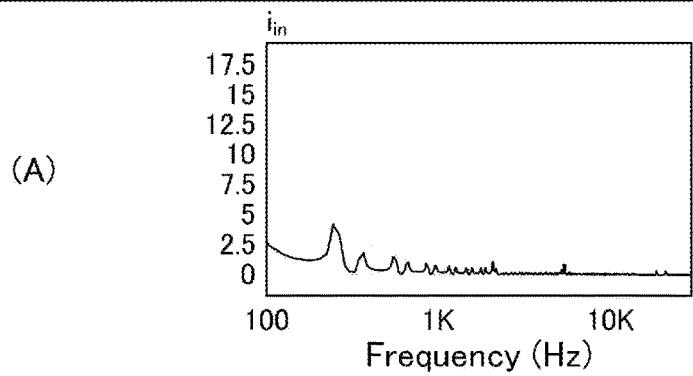
FIG. 12 is a diagram that illustrates frequency analysis results of simulation waveforms of respective parts according to an embodiment.
Figure 12:
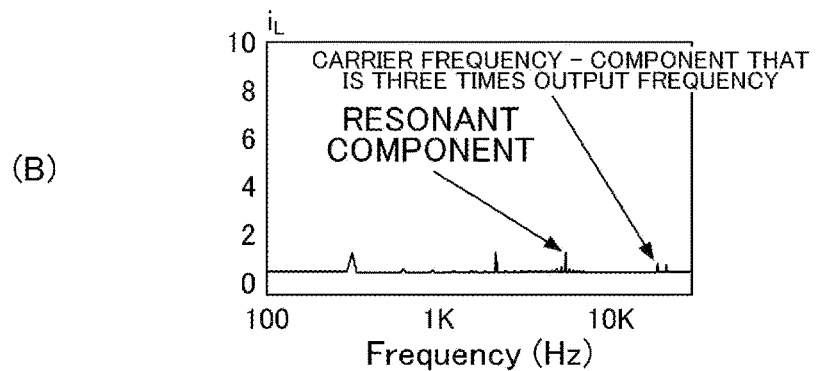
Figure 12:
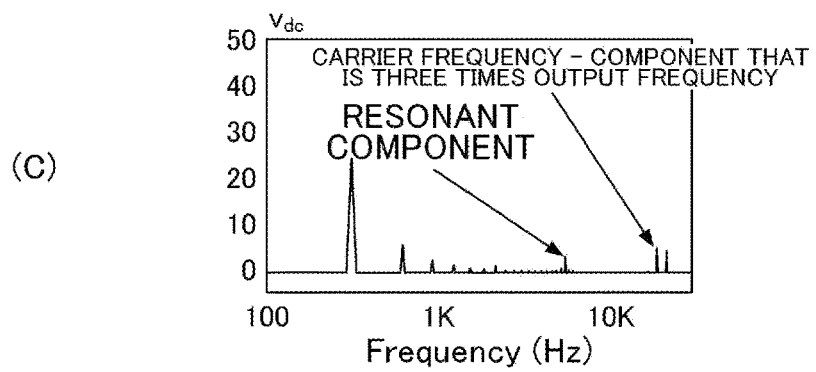
Figure 12:
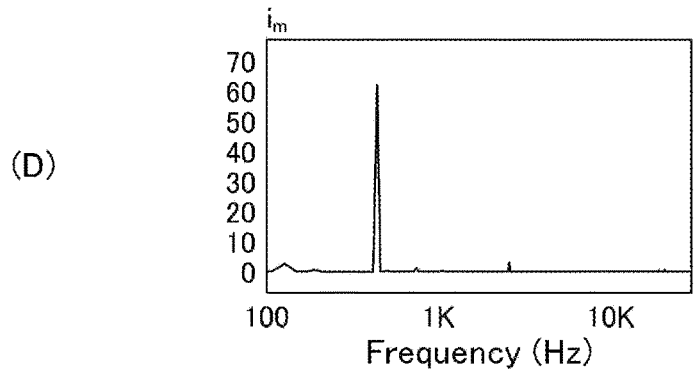
Figure 13:
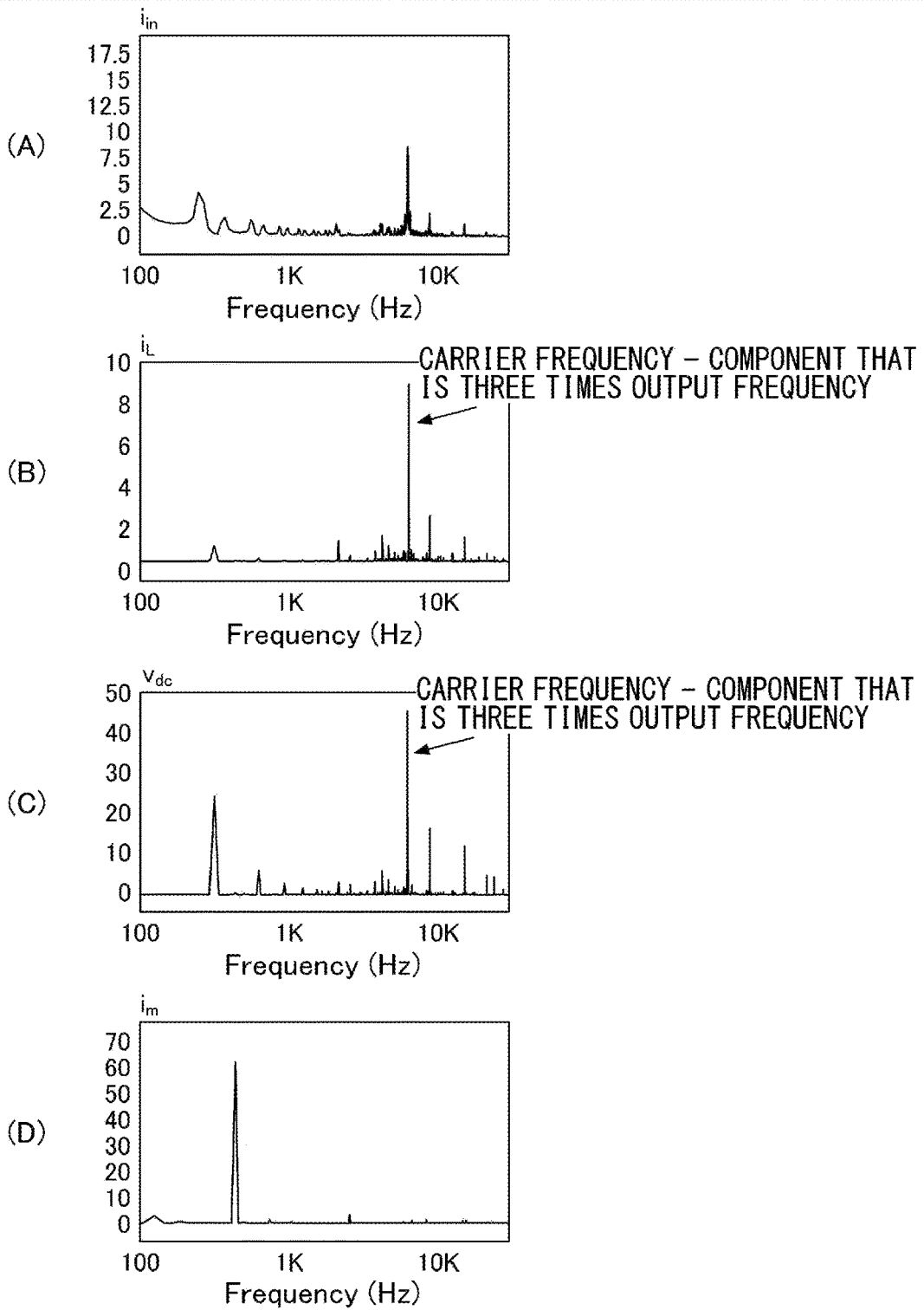
FIG. 13 is a diagram that illustrates frequency analysis results of simulation waveforms of respective parts according to a comparative example.

FIG. 10 to FIG. 13 show cases in which the harmonic component c (carrier frequency–(a component that is three times the output frequency)) appears. FIG. 10 and FIG. 11 show the waveforms of the power supply current $i_{in}$ of the AC power supply 6, the reactor current $i_L$ that flows in the reactor 8, the DC link voltage $v_{dc}$ in the DC link part 3, and the motor current $i_m$ that flows in the motor 7. FIG. 10 shows an embodiment to which the technique of the present disclosure is applied, and FIG. 11 shows a comparative example to which the technique of patent document 1 is applied. FIG. 12 and FIG. 13 show frequency analysis results of the power supply current $i_{in}$ of the AC power supply 6, the reactor current $i_L$ that flows in the reactor 8, the DC link voltage $v_{dc}$ in the DC link part 3, and the motor current $i_m$ that flows in the motor 7, based on the fast Fourier transform. FIG. 12 shows an embodiment to which the technique of the present disclosure is applied, and FIG. 13 shows a comparative example to which the technique of patent document 1 is applied.

In the case of FIG. 13, the harmonic component c (carrier frequency–(a component that is three times the output frequency)) appears near the resonance frequency of the LC filter. On the other hand, in the case of FIG. 12, the harmonic component c (carrier frequency–(a component three times the output frequency)) appears at a distance from the resonance frequency of the LC filter. As illustrated in FIG. 12 and FIG. 13, the technique of the present disclosure reduces the peak of the harmonic component c (carrier frequency–(a component three times the output frequency)) on the lower frequency side, compared to the technique of patent document 1. In this way, as illustrated in FIG. 10 and FIG. 11, according to the technique of the present disclosure, harmonics superimposed on the power supply current $i_{in}$, the reactor current $i_L$, and the DC link voltage $v_{dc}$ are reduced, compared to the technique of patent document 1. Note that the conditions upon the simulations of FIG. 10 to FIG. 13 are shown in FIG. 15.

Also, in the first example structure, the LC filter is arranged in the DC link part 3. However, if similar LC filter functions can be realized, even if the LC filter is placed between the AC power supply 6 and the converter circuit 2, only the reactor that constitutes the LC filter may be connected between the AC power supply 6 and the converter circuit 2.

Also, in the second example structure, the capacitor 3a that constitutes the LC filter is arranged in the DC link part 3. However, as long as similar LC filter functions can be realized, the capacitor that constitutes the LC filter may be connected between the AC power supply 6 and the converter circuit 2, or the LC filter may be connected between the AC power supply 6 and the converter circuit 2. In other words, the LC filter may be placed anywhere insofar as a capacitor is connected between the reactor and the inverter circuit (inverter) that constitute the LC filter.

Also, the LC filter may be formed without a reactor. For example, an LC filter may be formed with an inductance component of a conductive line and a capacitor.

Although an embodiment has been described above, it should be understood that various changes in form and detail may be made without departing from the spirit and scope of the appended claims. Various modifications and improvements such as combination or replacement with part or all of other embodiments are possible.

This international application is based on and claims priority to Japanese Patent Application No. 2021-061704, filed Mar. 31, 2021, the entire content of which is incorporated herein by reference.

REFERENCE SIGNS LIST 1A, 1B power conversion apparatus
2 converter circuit
3 DC link part
4 inverter circuit
4a switching element
5 control part
6 AC power supply
7 motor
8 reactor
10 electrical unit
15 housing
15d through-hole
20 power conversion apparatus
31, 32 conductive line
47 heat sink
60 substrate 61, 62, and 63, 64, 65, 66 conductive line
80 coupling member
101 air conditioner

The invention claimed is:

1. A power conversion apparatus comprising: a converter configured to convert AC power that is input from an AC power supply via a first conductive line pair, into DC power; an inverter configured to convert the DC power that is output from the converter to a second conductive line pair, into the AC power; and a capacitor connected between conductive lines of the first conductive line pair or between conductive lines of the second conductive line pair, wherein, letting an inductance of an inductance component from a point where the power conversion apparatus is connected to the AC power supply, to the capacitor, be L a maximum value of output frequency of the inverter be MAX(fo), —C, which is a capacitance of the capacitor (C), satisfies $$C < \frac{1}{144\pi^2 \times \{MAX(f_o)\}^2 \times L}.$$

2. The power conversion apparatus according to claim 1, wherein, letting a carrier frequency for driving the inverter be $f_c$, a gain of an LC filter constituted by the inductance component and the capacitor at the carrier frequency $f_c$ is equal to 0.1 or less.

3. The power conversion apparatus according to claim 1, wherein a gain of an LC filter constituted by the inductance component and the capacitor at 6 times MAX($f_0$) is equal to 5 or less.

4. The power conversion apparatus according to claim 1, wherein the inductance component includes
one or more reactors inserted in series into one or both of the conductive lines of the first conductive line pair or into one or both of the conductive lines of the second conductive line pair, and
wherein the capacitor is connected between the conductive lines of the first conductive line pair or between the conductive lines of the second conductive line pair, between the one or more reactors and the inverter.

5. A power conversion apparatus comprising: a converter configured to convert AC power that is input from an AC power supply via a first conductive line pair, into DC power; an inverter configured to convert the DC power that is output from the converter to a second conductive line pair, into the AC power; one or more reactors inserted in series in one or both of conductive lines of the first conductive line pair or one or both of conductive lines of the second conductive line pair; and a capacitor connected between the conductive lines of the first conductive line pair or between the conductive lines of the second conductive line pair, between the one or more reactors and the inverter, wherein, letting a carrier frequency for driving the inverter be fc, a resonance frequency of an LC filter constituted by the one or more reactors and the capacitor be $f_{LC}$, and a maximum value of an output frequency of the inverter be MAX(fo), MAX(fo) satisfies $6 \times MAX(f_0) < f_{LC} < f_c - 3 \times MAX(fo)$.

6. The power conversion apparatus according to claim 5, wherein a gain of the LC filter at the carrier frequency $f_c$ is equal to 0.1 or less.

7. The power conversion apparatus according to claim 5, wherein a gain of the LC filter at 6 times MAX($f_0$) is equal to 5 or less.

8. The power conversion apparatus according to claim 4, wherein the one or more reactors are components mounted on a substrate.

9. The power conversion apparatus according to claim 1, wherein the capacitor is connected between the conductive lines of the second conductive line pair.

10. The power conversion apparatus according to claim 1, wherein MAX($f_0$) is 600 Hz.

11. The power conversion apparatus according to claim 1, wherein a switching element provided in the inverter is a wide band gap semiconductor device.

12. An air conditioner comprising the power conversion apparatus according to claim 1.

13. A refrigeration apparatus comprising the power conversion apparatus according to claim 1.

* * * * *